United States Patent [19]

Sullivan et al.

[11] 4,055,607
[45] Oct. 25, 1977

[54] ACRYLIC COATING COMPOSITIONS

[75] Inventors: Thomas R. Sullivan, Natrona Heights; Roger M. Christenson, Gibsonia; Suryya K. Das, Pittsburgh; Rostyslaw Dowbenko, Gibsonia, all of Pa.

[73] Assignee: PPG Industries, Inc., Pittsburgh, Pa.

[21] Appl. No.: 602,857

[22] Filed: Aug. 7, 1975

Related U.S. Application Data

[63] Continuation-in-part of Ser. No. 296,741, Oct. 11, 1972, abandoned.

[51] Int. Cl.$^2$ .................. C08L 61/28; C08L 51/08; C08K 5/01
[52] U.S. Cl. .................. 260/851; 260/30.4 EP; 260/31.8 M; 260/31.8 T; 260/33.4 R; 260/33.4 P; 260/33.6 UA; 260/834; 260/836; 260/837 R; 260/856
[58] Field of Search .............. 260/851, 856, 834, 836, 260/837, 36.6 UA

[56] References Cited

U.S. PATENT DOCUMENTS

| | | | |
|---|---|---|---|
| 3,365,414 | 1/1968 | Fisk et al. | 260/856 |
| 3,652,472 | 3/1972 | Clarke et al. | 260/33.6 UA |
| 3,666,710 | 5/1972 | Makhlouf et al. | 260/33.6 UA |
| 3,702,836 | 11/1972 | Walbridge | 260/856 |
| 3,745,137 | 7/1973 | Reid et al. | 260/33.6 UA |

FOREIGN PATENT DOCUMENTS

| | | | |
|---|---|---|---|
| 967,051 | 8/1964 | United Kingdom | 260/33.6 UA |

*Primary Examiner*—John C. Bleutge
*Attorney, Agent, or Firm*—George D. Morris

[57] ABSTRACT

Insoluble microgel particles are added to solutions of polymerized ethylenically unsaturated monomers containing hydroxyl groups. The solutions may be spray coated onto various substrates in two coat applications to form coatings having improved gloss, film build and pattern control. The coatings are especially useful as automotive finishes.

8 Claims, No Drawings

4,055,607

ACRYLIC COATING COMPOSITIONS

CROSS REFERENCE TO RELATED APPLICATION

This application is a continuation-in-part of application Ser. No. 296,741, filed Oct. 11, 1972 now abandoned.

These are many fields in which it is desirable to use acrylic polymer topcoats for purposes of protection and for aesthetic reasons. There are two general methods of preparing protective or decorative acrylic coatings, one of which is based on solution and the other on non-aqueous dispersion polymers. The first method which reaches back to the introduction of acrylic polymers into commercial use in coatings, is based on the traditional solution polymerization of acrylic monomers.

Two types of acrylic polymers have been widely used for both solutions and dispersions. The first is a thermoplastic non-crosslinking system that is applied as a lacquer. The second is a thermosetting acrylic dispersion which is a crosslinking system base on polymers with hydroxyl functionality cured with a melamine-formaldehyde resin. The solution polymer of either type is formulated according to methods well known in the art. The ingredients that are used in formulating a coating based on an acrylic solution polymer usually include pigments, fillers, plasticizers, flow aids, additional solvents and diluents and other materials which are collectively used to impart desired properties to the coating solution as well as to the coating film.

For reasons of economy, it is important that the coating compositions can be applied rapidly and efficiently. In particular, with the constant striving for higher productivity in industry, methods of applying paint to yield a standard film thickness in two coats instead of three or more and which still produce a serviceable coating is clearly a desirable goal to those concerned with application of coatings in production.

As mentioned above, the second more recent method is based on non-aqueous dispersion polymers. The latter, which are now being introduced, are prepared by heating a mixture of acrylic monomers in the presence of a catalyst together with a dispersion stabilizer in organic solvents in which the polymer formed is substantially insoluble. The non-aqueous dispersion polymers, as produced according to the methods known in the art are desirable as they form easily pourable, essentially non-viscous liquids with substantially higher non-volatile contents than those in solution polymers.

The formulation of non-aqueous dispersion polymers into coatings is significantly different from formulations which are used for solution polymers. In order to retain the advantages of the non-aqueous dispersion technique throughout the preparation, storage, and application of the non-aqueous dispersion coatings, they are handled substantially as dispersions of particulate matter. Non-aqueous dispersion coatings in contrast to solution coatings, during their manufacture, storage, and application are formulated to take account of and retain the two phase nature of the dispersion polymer used. Solvent/diluent (non-solvent) ratios are selected with respect to evaporation rates which favor the enrichment of the percentage of solvent upon spray application of the coating because of more rapid evaporation of diluent. Finally, as the coating is subjected to baking temperatures common for industrial coating operations, the two phase dispersion polymer in the presence of active solvent is coalesced to form an integral coating film.

Oviously, the non-aqueous dispersions are not designed to be swamped with active solvents to then transform the dispersion to solution form as the advantages of the non-aqueous dispersions such as low viscosity, high solids and non-smog forming inexpensive diluents would be defeated thereby. Further, as one would expect the swamped dispersion to then have the same properties as a solution, it would be unwise to incur the added expense and consumption of time required to first form a non-aqueous dispersion.

A particular disadvantage of non-aqueous dispersions is that the presence of coalescence during storage may cause the dispersion to gel or otherwise damage the physical properties to such a degree as to render the material unusable.

One way to improve poor storage stability of non-aqueous dispersion coatings, and the method most often resorted to, is to precisely balance the composition of the active solvents and/or plasticizers present with the content of diluents (non-solvent). Some approaches to the stability problem of non-aqueous dispersion coatings include the use of more effective dispersion stabilizers in order to provide better protection to the polymer particles against dissolution and gelation. This has not been entirely successful.

All of these previous approaches bring some relief to the problems encountered in formulating coatings from both solution and non-aqueous dispersion polymers. The growth of the organic coatings industry in recent years is one indication of the progress that has been achieved.

In the automotive industry, which is one of the important uses of acrylic coatings, the problems involving solution and non-aqueous dispersion coatings discussed above acquires specific urgency. Competitive pressure requires the original production finishing of automobiles to make the most effective use of labor and materials. Economizing production line space and capability of increasing speed of completing unit operations such as painting therefore become important. Topcoat finishing, for example, that can achieve the same protective film thickness and beauty with two spray applications when three or more are standard practice, is regarded as a valuable modification.

Prior to this invention, commercial thermosetting acrylic enamel topcoats required at least three spray applications, particularly when pigmentation contained metallic flake, to deposit film of requisite thickness and appearance. This invention concerns the solution of the above-mentioned problems and additionally realizes further advantages to be mentioned below.

The invention is primarily concerned with improvements in thermosetting acrylic enamels such as increased efficiency of application, the ability to apply a satisfactory coating in two coats rather than three, and high gloss and excellent metallic pattern control to give an aesthetically pleasing appearance.

It has now been found that the addition of insoluble microgel particles to solutions of polymerized ethylenically unsaturated monomers containing at least one functional group capable of participating in a crosslinking reaction with a crosslinking agent, results in compositions which are capable of being sprayed to a high film build in two coats with increased coating efficiency and the film formed have dramatically improved pattern control, resistance to solvent popping and improved gloss.

The thermosetting acrylic polymer solution enamels are formed by polymerizing acrylic monomers in a solvent.

The acrylic monomers to be polymerized contain from about 4 to about 30 percent by weight of ethylenically unsaturated monomer containing at least one functional group capable of participating in a crosslinking reaction with a crosslinking agent. Examples of such monomers are the hydroxy containing ethylenically unsaturated monomers, exemplified by the hydroxyalky acrylates and hydroxyalky methacrylates such as 2-hydroxyethyl acrylate, 2-hydroxypropyl acrylate, 3-hydroxypropyl acrylate, 4-hydroxybutyl acrylate, hydroxyhexyl acrylate, hydroxyoctyl acrylate, 2-hydroxyethyl methacrylate, 2-hydroxpropyl methacrylate, 2-hydroxypropyl methacrylate, 4-hydroxybutyl methacrylate, hydroxyhexyl methacrylate, hydroxyoctyl methacrylate, allyl and methally alcohol, butyl hydroxyethyl maleate and fumarate, butyl hydroxypropyl maleate and fumarate, and the like. The preferred hydroxy containing alkyl acrylates contain up to about 8 carbon atoms in the alkyl group. Further examples of crosslinkable monomers are the ethylenically unsaturated acids such as acrylic acid, methacrylic acid, ethacrylic acid, crotonic acid, isocrotonic acid, tiglic acid, angelic acid, cinnamic acid, maleic acid, fumaric acid, aconitic acid, citraconic acid, mesaconic acid and glutaconic acid. Ethylenically unsaturated acid amides such as acrylamide and methacrylamide are satisfactory, as are the ethylenically unsaturated epoxy functional compounds exemplified by glycidyl acrylate and glycidyl methacrylate. Still another class of suitable crosslinkable monomer is the isocyanate functional ethylenically unsaturated monomer. These may be prepared by reaction a hydroxy-functional ethylenically unsaturated compound with a polyisocyanate such that isocyanato groups are in excess. The hydroxy-functional ethylenically unsaturated compounds of the type exemplified above are satisfactory. Illustrative of suitable polyisocyanates are 2,4-diisocyanatotoluene, 2,6-diisocyanatotoluene, bis(4-isocyanatocyclohexyl) methane, bis(4-isocyanatophenyl)methane, 1,6-diisocyanatohexane and 1-isocyanatomethyl-5-isocyanato-1,3,3-trimethylcyclohexane. A subclass of particular interest is the reaction product of about one mole of a hydroxyalkyl acrylate or methacrylate and about one mole of a diisocyanate, such as the compound 0-2-acrylyloxyethyl-N-4-(2-isocyanatotolyl)carbamate which is prepared by reacting about one mole of 2-hydroxyethyl acrylate and about one mole of 2,4-diisocyanatotoluene.

The crosslinkable monomers may be copolymerized with copolymerizable ethylenically unsaturated monomers which are free of functional groups capable of participating in a crosslinking reaction with a crosslinking agent to form the polymer solution as long as the final polymer contains at least about 4 percent by weight of the crosslinkable monomer. Examples of other monomers which may be copolymerized with the hydroxyl containing monomers are esters of alpha, beta ethylenically unsaturated monocarboxylic acids such as butyl acrylate, 2-ethylhexyl acrylate, octyl methacrylate, lauryl methacrylate, and the like. Other copolymerizable monomers such as styrene, vinyl toluene, methyl methacrylate, methyl acrylate, ethyl acrylate, butyl methacrylate, and the like, may also be used. It is preferred that the monomer system contain from about 0.5 percent to about 15 percent by weight of an ethylenically unsaturated carboxylic acid.

The ethylenically unsaturated monomer or monomers may be polymerized in an active solvent for the polymer. Examples of active solvents which can be used are either aromatic hydrocarbons or oxygenated solvents such as esters, ketones, ethers, and halogenated hydrocarbons such as ethoxyethyl acetate (Cellosolve acetate), 2,2,4-trimethyl 1,3-pentane diol monoisobutyrate, acetone, toluene, methyl ketone, methyl isobutyl ketone, diisobutyl ketone, methyl isoamyl ketone, diethyl ether, amyl acetate, butyl acetate, ethylene glycol diacetate, cyclohexanone, trichlorotrifluoroethane, trichloromonofluoromethane, 2-nitro propane, and the like. Although inert active solvents are frequently used, the reactive active solvents are becoming of increasing interest. These reactive solvents are used as the solvent during the solution polymerization of the ethylenically unsaturated monomer or monomers. Upon completion of the polymerization, a crosslinking agent is added which, upon exposure of the composition to crosslinking conditions, crosslinks with both the polymer and the reactive solvent to form a thermoset polymer. Examples of such reactive active solvents are saturated carboxylic acids, saturated alcohols and saturated epoxides, each being liquid at the polymerization temperature employed and preferably, but not necessarily, also at room temperature. Of the acids, alcohols and epoxides which may be used as reactive solvents, monocarboxylic acids, monohydric alcohols and monoepoxides are suitable, but polycarboxylic acids, polyhydric alcohols and polyepoxides are preferred. It is preferred that the reactive solvents be those which cannot readily be liberated by heating the polymer after it is made. Examples are stearyl alcohol, lauryl alcohol, decyl alcohol, myristyl alcohol, octadecyl alcohol, ethylene glycol, propylene glycol, diethylene glycol, dipropylene glycol, glycidyl acetate, glycidyl benzoate and glycidyl polyethers of polyhydric alcohols and polyhydric phenols prepared by reacting the polyhydric alcohol or polyhydric phenol with a halohydrin such as epichlorohydrin in the presence of an alkali. Further examples of reactive solvents are given in U.S. Pat. No. 3,247,145 and U.S. Pat. No. 3,028,367.

The polymer solution generally may contain any solids content but it is preferred that the solution have a solids content of from about 40 to about 60 percent.

The unexpectedly superior gloss, pattern control and film build is achieved by adding microgel particles to the solution, either alone or in a mixture with another polymer such as in the form of a dispersion. The microgel particles have substantially the same refractive index as that of the polymerized ethylenically unsaturated monomers and have particle sizes of from about 1μ to about 40μ. The microgel particles are essentially insoluble in the formulating solvents such as aromatic hydrocarbons, ketones, esters, or alcohols or even tetrahydrofuran and are substantially crosslinked.

It is noted that the presence of at least 0.5 percent by weight of microgel, based on polymer solids, is critical to this invention. It has been found that the presence of the microgel particles offers a unique improvement over conventional solutions to be used as topcoats in that the film build (thickness of the film), gloss, efficiency of coating deposition and pattern control with metallic pigments are substantially improved.

The microgel particles are prepared by polymerizing ethylenically unsaturated monomers which may contain at least one functional group capable of participating in a crosslinking reaction with a crosslinking agent in a dispersing liquid which is a solvent for the monomers but a non-solvent for the resulting polymer in the presence of a multifunctional dispersion stabilizer.

Examples of the crosslinkable monomers which may be polymerized in this procedure are the same as those used in the polymer solutions herein. The monomers are polymerized in a dispersing liquid which solubilizes the monomers but in which the resulting polymers are essentially not soluble and form dispersed polymer particles. The non-solvent is generally a hydrocarbon medium consisting essentially of liquid aliphatic hydrocarbons. A pure hydrocarbon or a mixture of one or more may be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances, the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° C. up to about 235° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° C. to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° C. to 300° C.

Examples of non-solvents useful herein are pentane, hexane, heptane, octane, mixtures of the same, and the like.

Ordinarily, the polymerizable composition of monomers and non-solvent should contain from about 30 to about 80 percent by weight of the non-solvent. It is understood, however, that the monomeric solution need contain only that amount of non-solvent necessary to solubilize the monomers and maintain the resulting polymers in a dispersed state after polymerization.

The monomers are polymerized in the presence of dispersion stabilizers.

The dispersion stabilizer used therein is a branched copolymer comprising two types of polymer components of which one segment is solvated by the aliphatic hydrocarbon solvent and is usually not associated with polymerized particles of the polymerizable ethylenically unsaturated monomer and the second type is an anchor polymer of different polarity from the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reaction producing a polyester or polyether. Preferably, the polyester reaction is a simple one involving a monohydroxylic mono carboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized, such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphatic hydrocarbons.

The preferred polymeric segment (A) of the dispersion stabilizer is formed by reacting poly-(12-hydroxystearic acid) with glycidyl methacrylate.

The second polymeric segment (B) of the dispersion stabilizer is of polarity different from the first segment (A) and, as such is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. The copolymers are further reacted with polymerizable ethylenically unsaturated acids such as acrylic acid, methacrylic acid, 3-butenoic acid, crotonic acid, itaconic acid, and others mentioned previously which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually combined entities, the segment (A) being attached to the backbone of the graft copolymer and the segment (B) being carried in or on the backbone.

The monomer solution containing the stabilizer preferably contains from about 1 to about 25 percent by weight of the stabilizer.

The polymerization may be carried out in a conventional manner, utilizing heat and/or catalysts and varying solvents and techniques. Generally, a free radical catalyst such as cumene hydroperoxide, benzoyl peroxide or similar peroxygen compound, or an azo compound such as azobis(isobutyronitrile) is employed.

The resulting dispersion polymer contains the microgel particles which may be separated from the bulk of the polymer by diluting with active solvent, centrifuging, separating the clear upper layer and washing the microgel.

The microgel particles may also be obtained by filtering the dispersion polymer on a fritted glass filter and washing with tetrahydrofuran.

The method of preparing microgel particles is described in application Ser. No. 296,700, filed Oct. 11, 1972, now U.S. Pat. No. 3,880,796, issued Apr. 29, 1975.

The microgel particles may be merely added to the thermosetting composition without the need for elaborate conditions. In a preferred embodiment, the microgel particles are added to the polymer solution by merely blending the non-aqueous dispersion in which the microgel particles are formed with the solution.

The compositions may also contain other ingredients such as crosslinking agent, coalescing agents, catalysts, plasticizers, fillers, pigments, and the like. This invention is particularly useful in the deposition of films containing metallic flake pigments such as aluminum, nickel, stainless steel, or the like, as the pattern control of the resulting film is excellent.

The acrylic thermosetting enamel polymer solution containing the added microgel particles is then mixed with a crosslinking agent such as an aminoplast resin and the resulting mixture, when applied as a coating, is crosslinked usually by baking.

The aminoplast resins used as crosslinkers for the polymer are aldehyde condensation products of melamine, urea, acetoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amine group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzylurea, N,N'-ethyleneurea, diazine diamide, formoguanamine, benzoguanamine, ammeline, 2-chloro-4,6-diamino-1,3,5-triazine, 3,5-diaminotriazole, 4,6-diaminopyrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially an monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

The preferred system is a hydroxyl functional polymer in admixture with an aminoplast resin crosslinking agent.

The crosslinking agent should comprise from about 5 percent to about 50 percent by weight of the composition. The aminoplast may be merely added to the composition or, if desired, may be added at elevated temperatures such as 40° C. or higher.

The compositions are quite useful as coatings on substrates. The compositions are merely applied to the substrate and baked at 150° to 350° F. for about 5 to about 60 minutes to cure the coating on the substrate. The coatings may be applied by any conventional means such as spray coating, dip coating, roll coating, and the like. The preferred method is spray coating as the compositions containing microgel particles can be applied with good deposition efficiency and rapid film build.

Any substrate as paper, metal, wood, paperboard, plastic, and the like may be coated with the composition. The preferred substrate is metal or primed metal such as found in automobile bodies.

The following Examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE 1

A flask was charged with 386.5 grams of heptane, 386.5 grams of hexane, 64.8 grams of methyl methacrylate, 4.6 grams of azobisisobutyronitrile and 18.0 grams of the dispersion stabilizer comprising a 36.4 percent solids solution of 44 percent methyl methacrylate, 4.9 percent glycidyl methacrylate, 50.4 percent of a reaction product of 90.3 percent poly-12-hydroxystearic acid and 9.7 percent glycidyl methacrylate, and 0.7 percent methacrylic acid and heated to reflux at 77° C. After heating for 20 minutes, the flask was charged with 146 grams of hydroxyethyl acrylate, 37.5 grams of methacrylic acid, 438 grams of styrene, 285 grams of butyl methacrylate, 193.2 grams of methyl methacrylate, 292 grams of ethylhexyl acrylate, 4.5 grams of octyl mercaptan, 10 grams of azobisisobutyronitrile, 11 grams of hydroxyethylethylene imine, and 423 grams of the dispersion stabilizer over a period of three hours. After an additional hour at 88.5° C., 2 grams of azobisisobutyronitrile were added and for the next 2-½ hours, 2 grams of azobisisobutyronitrile were added every ½ hour. The composition was cooled and 150 grams of heptane and 150 grams of hexane were added. To the dispersion polymer were added 174.4 parts of cellosolve acetate, 101.6 parts of VM&P naphtha, 101.6 parts of Solvesso 150 aromatic solvent, 68.8 parts of isopropyl alcohol and 133.6 parts of butanol.

To 112 grams of the above thermosetting acrylic polymer dispersion were added 6.7 grams of a butylated melamine formaldehyde resin and 6.3 grams of solvent mixture comprised of 50 percent acetone, 30 percent cellosolve acetate, 12 percent toluene and 8 percent Solvesso 150. The resulting mixture was centrifuged and filtered and was found to contain about 10 percent by weight of microgel particles based on total non-volatiles.

Six parts of the microgel removed from the dispersion were then added to 60 parts of a thermosetting acrylic polymer solution comprising a 50 percent solution in 90 percent xylene and 10 percent butanol of a polymer comprising 10 percent hydroxyethyl acrylate, 2.5 percent methacrylic acid, 30 percent styrene, 20 percent 2-ethylhexyl acrylate, 19.5 percent butyl methacrylate and 18 percent methyl methacrylate, 40 parts of melamine formaldehyde resin and 2 parts of aluminum pigment.

The above composition was let down with a solvent thinner to a viscosity of 30 seconds measured by a No. 4 Ford cup and further thinned by 25 percent volume reduction with a 1:1 xylene Solvesso 100 aromatic solvent thinner to a viscosity of 17 seconds measured in a No. 4 Ford cup and sprayed onto a panel, flashed for 2 minutes at room temperature at which time another coat was applied, and flashed for 5 minutes at room temperature and then baked at 250° F. for 30 minutes to cure.

This film was compared to the same composition without the microgel addition and coated in the same manner.

The film build of the film applied with the microgel addition was 1.96 mils while the film build of the film without microgel was only 1.76 mils. Further, the 20° gloss meter reading of the microgel containing film was 71 percent while the gloss of the film without microgel was only 67 percent. The pattern control of the microgel contaning film was good compared to poor for the film without microgel.

EXAMPLE 2

Forty parts of the non-aqueous thermosetting acrylic dispersion polymer described in Example 1 was added without centrifugation and microgel separation to 20 parts of a thermosetting acrylic polymer solution comprising a 50 percent solution in 90 percent xylene and 10 percent butanol of a polymer comprising 10 percent hydroxyethyl acrylate, 1.8 percent methacrylic acid, 0.7 percent hydroxyethylethylene imine, 30 percent styrene, 20 percent ethylhexyl acrylate, 0.06 percent azobisisobutyronitrile, 19.5 percent butyl methacrylate and 18 percent methyl methacrylate, 40 parts of butylated melamine formaldehyde resin and 2 parts of aluminum pigment.

The above composition was thinned with a solvent thinner to spraying viscosity and applied as described in Example 1. The film was compared to the same composition without the dispersion polymer addition and coated in the same manner.

The film build of the film applied with the dispersion polymer addition was 1.96 mils while the film build of the film without the dispersion polymer addition was only 1.76 mils. Further, the 20° gloss meter reading of the dispersion polymer modified film was 73 percent while the gloss of the film with the dispersion polymer addition was only 65 percent. The pattern control of the dispersion polymer containing film was good compared to poor for the film without the dispersion polymer addition.

EXAMPLE 3

Thirty parts of the non-aqueous thermosetting acrylic dispersion polymer described in Example 1 were added without centrifugation and microgel separation to 30 parts of a thermosetting acrylic polymer solution comprising a 50 percent solution in 90 percent xylene and 10 percent butanol of a polymer comprising 10 percent hydroxyethyl acrylate, 1.8 percent methacrylic acid, 0.7 percent hydroxyethylethylene imine, 30 percent styrene, 20 percent ethylhexyl acrylate, 0.06 percent azobisisobutyronitrile, 19.5 percent butyl methacrylate, and 18 percent methyl methacrylate, 40 parts of butylated melamine formaldehyde resin and 2 parts of aluminum pigment.

The above composition was let down with a solvent thinner to spraying viscosity and applied as described in Example 1.

The film was compared to the same composition without the dispersion polymer addition and coated in the same manner. The film build of the film applied with the dispersion polymer addition was 1.90 mils while the film build of the film without the dispersion polymer addition was only 1.76 mils. Further, the 20° gloss meter reading of the dispersion modified film was 73 percent while the gloss of the film without the dispersion addition was only 65 percent. The pattern control of the dispersion polymer containing film was good compared to poor for the film without the dispersion polymer addition.

EXAMPLE 4

To 20 parts of the non-aqueous thermosetting acrylic dispersion polymer described in Example 1 were added, without centrifugation and microgel separation, 40 parts of a thermosetting acrylic polymer solution comprising a 50 percent solution in 90 percent xylene and 10 percent butanol of a polymer comprising 10 percent hydroxyethyl acrylate, 1.8 percent methacrylic acid, 0.7 percent hydroxyethylethylene imine, 30percent styrene, 20 percent ethylhexyl acrylate, 19.5 percent butyl methacrylate, 0.06 percent azobisisbutyronitrile, and 18 percent methyl methacrylate, 40 parts of butylated melamine formaldehyde resin and 2 parts of aluminum pigment.

The above composition was let down with a solvent thinner to spraying viscosity and applied as described in Example 1.

The film was compared to the same composition without the dispersion polymer addition and coated in the same manner. The film build of the film applied with the dispersion polymer addition was 1.85 mils while the film build of the film without the dispersion polymer addition was only 1.76 mils.

Further, the 20° gloss meter reading of the dispersion modified film was 69 percent while the gloss of the film without the dispersion addition was only 65 percent. The pattern control of the dispersion polymer containing film was fair compared to poor for the film without the dispersion polymer addition.

According to the provisions of the patent statutes, there is described above the invention and what are now considered to be its best embodiments. However, within the scope of the appended claims, it is to be understood that the invention can be practiced otherwise than as specifically described.

We claim:
1. A thermosetting polymer composition comprising:
   a. at least one polymer which is the copolymerization product of ethylenically unsaturated monomers, said ethylenically unsaturated monomers comprising
      1. from about 4 to about 30 percent by weight hydroxy-containing ethylenically unsaturated monomer, and
      2. from about 0.5 to about 15 percent by weight ethylenically unsaturated carboxylic acid;
   b. an active solvent in which said polymer is dissolved to form a polymer solution;
   c. at least 0.5 percent by weight microgel particles based on the weight of polymer solids in said composition, said microgel particles
      1. being the addition copolymerization product of ethylenically unsaturated monomers and a dispersion stabilizer, said ethylenically unsaturated monomers comprising:
         a. hydroxy-containing ethylenically unsaturated monomer, and
         b. hydroxy-free ethylenically unsaturated monomers,
      2. being substantially crosslinked,
      3. being substantially insoluble in said active solvent,
      4. being substantially insoluble in tetrahydrofuran,
      5. having substantially the same refractive index as that of said dissolved polymer, and
      6. being of size in the range of from about 1 to about 40 microns; and
   d. an aminoplast resin in an amount in the range of from about 5 to about 50 percent by weight of said composition
   wherein
   e. said dispersion stabilizer in said microgel particles is a branched copolymer containing two polymeric segments of which one segment is solvated by an aliphatic hydrocarbon dispersing liquid and said second segment is
      1. an anchor polymer of different polarity to said first segment,
      2. relatively non-solvatable by said dispersing liquid, and
      3. contains pendant groups which have been addition copolymerized with said ethylenically unsaturated monomers of said microgel particles.

2. The composition of claim 1 wherein the hydroxy-containing ethylenically unsaturated monomer of said dissolved polymer and the hydroxy-containing ethylenically unsaturated monomer of said microgel particles are hydroxy alkyl esters of acrylic or methacrylic acid.

3. The composition of claim 1 wherein said ethylenically unsaturated monomers of said dissolved polymer additionally comprise at least one other copolymerizable ethylenically unsaturated monomer.

4. The composition of claim 1 wherein the solids content of said polymer solution is in the range of from about 40 to about 60 percent.

5. The composition of claim 1 wherein said dispersion stabilizer is the addition interpolymerization product of ethylenically unsaturated monomers comprising
   a. methyl methacrylate
   b. glycidyl methacrylate, and
   c. the reaction product of poly-12-hydroxystearic acid and glycidyl methacrylate
wherein methacrylic acid has been reacted with glycidyl groups of the glycidyl methacrylate specified in subparagraph b.

6. A thermosetting polymer composition comprising:
   a. at least one polymer which is the copolymerization product of ethylenically unsaturated monomers, said ethylenically unsaturated monomers comprising from about 4 to about 30 percent by weight ethylenically unsaturated monomer containing at least one functional group capable of participating in a crosslinking reaction with an aminoplast resin crosslinking agent, said monomer being selected from the group consisting of hydroxy containing ethylenically unsaturated monomer, ethylenically unsaturated acid, ethylenically unsaturated acid amide, ethylenically unsaturated epoxy functional compound and isocyanate functional ethylenically unsaturated monomer;
   b. at least 0.5 percent by weight microgel particles based on the weight of polymer solids in said composition, said microgel particles
      1. being the addition copolymerization product of ethylenically unsaturated monomers and a dispersion stabilizer, said ethylenically unsaturated monomers comprising:
         a. ethylenically unsaturated monomer containing at least one functional group capable of participating in a crosslinking reaction with an aminoplast resin crosslinking agent, said monomer being selected from the group consisting of hydroxy containing ethylenically unsaturated monomer, ethylenically unsaturated acid, ethylenically unsaturated acid amide, ethylenically unsaturated epoxy functional compound and isocyanate functional ethylenically unsaturated monomer, and
         b. ethylenically unsaturated monomer free of functional groups capable of participating in a crosslinking reaction with an aminoplast resin crosslinking agent,
      2. being substantially crosslinked,
      3. being substantially insoluble in tetrahydrofuran, and
      4. being of size in the range of from about 1 to about 40 microns; and
   c. an aminoplast resin crosslinking agent in an amount in the range of from about 5 to about 50 percent by weight of said composition
   wherein
   d. said dispersion stabilizer in said microgel particles is a branched copolymer containing two polymeric segments of which one segment is solvated by an aliphatic hydrocarbon dispersing liquid and said second segment is
      1. an ancohor polymer of different polarity to said first segment, 2. relatively non-solvatable by said dispersing liquid, and
3. contains pendant groups which have been addition copolymerized with said ethylenically unsaturated monomers of said microgel particles.

7. The thermosetting polymer composition of claim 6 including an active solvent in which said polymer is dissolved to form a polymer solution, said microgel particles being substantially insoluble in said active solvent.

8. A thermosetting polymer composition comprising:
a. at least one polymer which is the copolymerization product of ethylenically unsaturated monomers, said ethylenically unsaturated monomers comprising
   1. from about 4 to about 30 percent by weight hydroxy-containing ethylenically unsaturated monomer, and
   2. from about 0.5 to about 15 percent by weight ethylenically unsaturated carboxylic acid;
b. an active solvent in which said polymer is dissolved to form a polymer solution;
c. at least 0.5 percent by weight microgel particles based on the weight of polymer solids in said composition, said microgel particles
   2. being the addition copolymerization product of ethylenically unsaturated monomers and a dispersion stabilizer, said ethylenically unsaturated monomers comprising:
      a. hydroxy-containing ethylenically unsaturated monomer, and
      b. hydroxy-free ethylenically unsaturated monomers,
   2. being substantially crosslinked,
   3. being substantially insoluble in said active solvent,
   4. being substantially insoluble in tetrahydrofuran,
   5. being of size in the range of from about 1 to about 40 microns; and
d. an aminoplast resin in an amount in the range of from about 5 to about 50 percent by weight of said composition wherein
e. said dispersion stabilizer in said microgel particles is a branched copolymer containing two polymeric segments of which one segment is solvated by an aliphatic hydrocarbon dispersing liquid and said second segment is
   1. an anchor polymer of different polarity to said first segment,
   2. relatively non-solvatable by said dispersing liquid, and
   3. contains pendant groups which have been addition copolymerized with said ethylenically unsaturated monomers of said microgel particles.

* * * * *